United States Patent [19]

Otrhalek et al.

[11] 4,000,082

[45] Dec. 28, 1976

[54] DEFOAMING COMPOSITIONS BASED ON LITHIUM SALTS

[75] Inventors: Joseph V. Otrhalek, Dearborn; Robert E. Gansser, Wyandotte, both of Mich.

[73] Assignee: BASF Wyandotte Corporation, Wyandotte, Mich.

[22] Filed: Oct. 2, 1975

[21] Appl. No.: 618,790

[52] U.S. Cl. .................................. 252/135; 134/40; 252/89 R; 252/321; 252/358; 252/548

[51] Int. Cl.[2] ..................... C11D 3/04; B01D 19/04

[58] Field of Search ............ 252/321, 358, 89, 133, 252/135, 156, 548; 134/40

[56] References Cited

UNITED STATES PATENTS

| | | | |
|---|---|---|---|
| 3,048,548 | 8/1962 | Martin et al. | 252/135 |
| 3,066,104 | 11/1962 | Dasca et al. | 252/526 |
| 3,660,297 | 5/1972 | McCammon | 252/156 |
| 3,679,589 | 7/1972 | Schnegelberger et al. | 252/156 X |
| 3,880,778 | 4/1975 | House | 252/156 X |

*Primary Examiner*—Harris A. Pitlick
*Attorney, Agent, or Firm*—Norbert M. Lisicki; Bernhard R. Swick; Robert E. Dunn

[57] ABSTRACT

Aqueous cleaning compositions incorporating lithium salts to inhibit foaming.

9 Claims, No Drawings

DEFOAMING COMPOSITIONS BASED ON LITHIUM SALTS

BACKGROUND OF THE INVENTION

1. Field of the Invention

This invention relates to improved cleaning compositions characterized by reduced foaming in the presence of fatty materials. More particularly, this invention relates to an aqueous degreasing composition suitable for spray cleaning consisting of a cleaner which has incorporated therein lithium salts effectively inhibiting excess foaming.

2. Description of the Prior Art

Industrial uses of heavy duty greases, which are usually lithium based greases, afforded unique problems of cleaning those metal parts which are so lubricated. It is necessary for periodic inspection of such metal parts as roller bearings from railroad cars or other heavy machinery to remove these used greases. The most expeditious way to remove greases from these metal surfaces is by the use of spray cleaning equipment. The cleaning compositions are alkaline based cleaners which incorporate heavy duty anionic surfactants. Unfortunately such cleaners which can expeditiously clean these metal surfaces tend to foam to such an extent that the cleaning process cannot continue. Prior art defoamers such as the silicone based defoamers and the low foaming nonionic wetting agents are not effective defoamers at the high concentrations of used heavy duty lithium based greases. In view of the prior art it is the object of this invention to provide a degreasing composition having improved defoaming properties.

Summary of the Invention

In accordance with this invention there is provided an aqueous cleaning solution for spray cleaning greasy surfaces containing a lithium salt for controlling the formation of foam during the spray cleaning.

DESCRIPTION OF THE PREFERRED EMBODIMENT

In a preferred embodiment of this invention there is provided an aqueous cleaning composition concentrate which typically consists of by weight about 0 to 20 percent sequestering agent, about 1.5 to about 5 percent anionic surface active agent, about 0.1 to about 1.0 non-ionic surface active agent, about 5 to about 50 percent of a highly alkaline compound which is suitable for grease removal, with the balance being water. This alkaline compound is selected from the group consisting of sodium hydroxide, potassium hydroxide, ammonium hydroxide, sodium carbonate, potassium carbonate, sodium bicarbonate, potassium bicarbonate, sodium metaborate, sodium tetraborate, potassium metaborate, potassium tetraborate, monoethanolamine, diethanolamine, and triethanolamine. More preferably, the concentrate contains by weight about 3 percent sequestering agent, about 9 percent sodium hydroxide, about 4 percent anionic surface active agent, about 1 percent non-ionic surface active agent, and 83 percent water. This concentrate when diluted with water is ready for use as a spray cleaning degreasing composition.

According to this invention, lithium salts are added to the foregoing composition to obtain the desired properties. Typically, a lithium salt is added to the foregoing composition in an amount from 1.0 to about 5 weight percent of the concentrate. More preferably, the amount of lithium salt will be from about 2 to about 4 percent of said concentrate.

Of the lithium salts which may be employed to achieve the purposes of this invention are lithium hydroxide, which is commercially available both as the anhydrous and as the monohydrate salt, lithium carbonate, lithium bicarbonate, lithium chloride, lithium bromide, lithium nitrate, lithium sulfate, and lithium hypochlorite. The preferred lithium salt is the lithium hydroxide monohydrate. The choice of lithium salt is generally determined by the type of alkaline compound present in the composition. This is due to the solubility limitations of lithium salt in the solution of the alkaline compound. Thus, it would not be practical to incorporate lithium carbonate into a composition containing sodium carbonate due to the low solubility of lithium carbonate in a solution of sodium carbonate.

The composition of this invention is generally employed by dilution with water in a ratio of 1 part by volume of concentrate with 4 parts by volume of water. It may be employed however in a volumetric proportion of concentrate to water of about 1:9 to about 1:1.

A representative formulation of a lithium based grease would contain about 14 percent lithium soap, i.e., lithium stearate, and about 86 percent mineral oil with trace quantities of free alkali, i.e., 0.01 percent, 0.15 percent water and about 0.1 percent free fatty acid.

Any sequestering agent which is capable of complexing calcium and magnesium ions in water may be employed. Among these are sodium gluconate, sodium glucoheptonate, (alpha + beta), sodium salt of ethylenediaminetetraacetic acid, trans-1,2-diaminocyclohexanetetraacetic acid monohydrate, diethylene triamine pentaacetic acid, sodium salt of nitrilotriacetic acid, pentasodium salt of n-hydroxyethylenediamine triacetic acid, and the trisodium salt of n,n-di($\beta$-hydroxethyl)glycine. Preferably sodium alpha + beta glucoheptonate is employed.

Anionic surface active agents which may be employed include all those which would be considered low foaming and still have sufficient solubility for use in the formulation of this composition. Among these are the alkylnaphthalene sulfonates which include sodium methyl naphthalene sulfonate, sodium dimethyl naphthalene sulfonate, sodium isopropyl naphthalene sulfonate, sodium tetrahydronaphthalenesulfonate, sodium butyl naphthalene sulfate, sodium nonyl naphthalene sulfonate and sodium salts of sulfonated formaldehyde naphthalene condensates.

The presence of a defoaming nonionic surface active agent is desirable to prevent the foaming due to the anionic present. Among these are the polyoxyethylene polyoxypropylene condensation products which have defoaming properties. In addition, oxyalkylated straight chain primary aliphatic alcohols ranging from $C_{12}$ to $C_{18}$ and containing 75 weight percent alkylene oxide in the ratio of 2:1 propylene oxide to ethylene oxide may be employed. Preferably the nonionic employed is a polyoxypropylene hydrophobic base of about 1750 terminated with about 10 percent ethylene oxide.

Other ingredients may be added in the composition including such things as corrosion inhibitors, dyes, perfumes and so forth. Among those corrosion inhibitors which may be employed are 2-mercaptobenzotriazole, diethylthiourea, benzothiazole, and benzotriazole. The compositions of this invention are prepared by standard open kettle mixing techniques well known to those skilled in the art.

The following Examples are illustrative of the present invention and therefore are not intended in any way as a limitation on the scope thereof. Parts and percents are by weight unless otherwise indicated. These Examples illustrate both the composition of the degreasing concentrate and the process by which these concentrates are employed for cleaning heavily greased surfaces.

EXAMPLE I

The composition of Table I below was used to clean used lithium based grease from railroad car bearings in a commercial spray washer at a temperature of 190° F. Ten liters of a solution containing 20 percent of this composition removed 1.36 kilograms of grease during 16 hours of operation without generating any foam. A similar composition without the lithium hydroxide present, removed 151 grams of grease before foaming became so excessive the spray washer could not be operated.

Table I

| Composition | Weight Percent |
|---|---|
| Sodium (alpha + beta) glucoheptonate | 3.0 |
| Sodium hydroxide | 6.0 |
| Lithium hydroxide monohydrate | 2.0 |
| Linear alkyl naphthalene sulfonate(1) | 2.5 |
| Nonionic defoamer(2) | 0.8 |
| Benzotriazole | 0.2 |
| Water | 85.5 |

(1)Commercially available product sold by Petrochemicals Co., Inc. under the trade name PETRO BA.
(2)A polyoxyethylene adduct of a polyoxy-propylene base having a molecular weight of about 1750 wherein the oxyethylene content is about 10 weight percent of the molecule.

EXAMPLES 2–4

Test procedure for evaluation of various compositions for foam suppression

The test solution was composed of 200 mls. of the various compositions in 1 liter total volume of water in a 2 liter stainless steel beaker. The solution was stirred at a high rate of speed. The temperature of the solution was maintained at 180° F. Example 2 had 66 grams of used lithium based grease added to the solution. Examples 3 and 4 had 33 grams of used lithium grease added.

EXAMPLE 2

This Example illustrates the use of a composition in the absence of any chelating agent.

| Composition | Weight Percent |
|---|---|
| Lithium hydroxide, anhydrous | 2.4 |
| Sodium hydroxide | 8.0 |
| Linear alkyl naphthalene sulfonate(1) | 2.5 |
| Nonionic defoamer(2) | 0.3 |
| Water | 86.8 |

(1) and (2) are described in Example 1.

No foam discernible after 3 hours.

EXAMPLE 3

This Example illustrates a variation in the composition by the use of a different lithium salt.

| Composition | Weight Percent |
|---|---|
| Sodium (alpha + beta) glucoheptonate | 3.0 |
| Sodium hydroxide | 6.0 |
| Lithium chloride | 2.0 |
| Alkyl naphthalene sulfonate(1) | 2.5 |
| Nonionic defoamer(2) | 0.3 |
| Water | 86.2 |

(1) and (2) are described in Example 1.

No foam discernible after 2.5 hours.

EXAMPLE 4

This Example illustrates that the quantity of lithium salt is at a minimum concentration for the inhibition of foam.

| Composition | Weight Percent |
|---|---|
| Sodium (alpha + beta) glucoheptonate | 1.5 |
| Sodium hydroxide | 10.0 |
| Lithium hydroxide, anhydrous | 1.2 |
| Alkyl naphthalene sulfonate(1) | 2.5 |
| Nonionic defoamer(2) | 0.3 |
| Water | 84.5 |

(1) and (2) are as described in Example 1.

Small amount of foam on surface after 1 hour.

The embodiments of the invention in which an exclusive property or privilege is claimed are defined as follows:

1. In an aqueous cleaning composition concentrate consisting essentially of by weight about 0 to about 20 percent sequestering agent, about 1.5 to about 5 percent anionic surface active agent, about 0.1 to about 1.0 percent nonionic surface active agent, about 5 to about 50 percent of a compound selected from the group consisting of sodium hydroxide, potassium hydroxide, ammonium hydroxide, sodium carbonate, potassium carbonate, sodium bicarbonate, potassium bicarbonate, sodium metaborate, sodium tetraborate, potassium metaborate, potassium tetraborate, monoethanolamine, diethanolamine, and triethanolamine, balance, water, the improvement wherein said concentrate includes a lithium salt selected from the group consisting of lithium hydroxide, lithium carbonate, lithium bicarbonate, lithium chloride, lithium bromide, lithium nitrate, lithium sulfate and lithium hypochlorite, in an amount from about 1.0 to about 5 weight percent of said concentrate whereby improved defoaming properties are obtained.

2. The concentrate of claim 1 wherein the amount of lithium salt is from about 2 to about 4 weight percent of said concentrate.

3. The concentrate of claim 1 wherein the lithium salt is lithium hydroxide.

4. The degreasing composition consisting essentially of the concentrate of claim 1 and water in a volumetric proportion of concentrate to water of about 1:9 to about 1:1.

5. A process for controlling the formation of foam during the spray cleaning of greasy surfaces employing an aqueous cleaning solution consisting essentially of by weight about 0 to about 20 percent sequestering agent, about 1.5 to about 5 percent anionic surface active agent, about 0.1 to about 1.0 percent nonionic surface active agent, about 5 to about 50 percent of a compound selected from the group consisting of sodium hydroxide, potassium hydroxide, ammonium hydroxide, sodium carbonate, potassium carbonate, sodium bicarbonate, potassium bicarbonate, sodium metaborate, sodium tetraborate, potassium metaborate, potassium tetraborate, monoethanolamine, diethanolamine, and triethanolamine, balance water, comprising adding a lithium salt, selected from the group consisting of lithium hydroxide, lithium carbonate, lithium bicarbonate, lithium chloride, lithium bromide, lithium nitrate, lithium sulfate and lithium hypochlorite, to said cleaning solution.

6. The process of claim 6 wherein said cleaning solution is an aqueous solution of the concentrate of claim 1 and the amount of lithium salt is from about 1.0 to about 5 weight percent of said concentrate.

7. The process of claim 6 wherein the amount of lithium salt is from about 2 to about 4 weight percent of said concentrate.

8. The process of claim 6 wherein the lithium salt is lithium hydroxide.

9. The process of claim 6 wherein the volume ratio of concentrate to water is from about 1:9 to about 1:1.

* * * * *

UNITED STATES PATENT OFFICE

CERTIFICATE OF CORRECTION

Patent No. 4,000,082 Dated December 28, 1976

Inventor(s) Joseph V. Otrhalek and Robert E. Gansser

It is certified that error appears in the above-identified patent and that said Letters Patent are hereby corrected as shown below:

Claim 6, line 1, "claim 6" should read -- claim 5 --.

Signed and Sealed this

Twenty-sixth Day of April 1977

[SEAL]

*Attest:*

RUTH C. MASON
*Attesting Officer*

C. MARSHALL DANN
*Commissioner of Patents and Trademarks*